May 11, 1971     T. E. PHILIPPS ET AL     3,578,426
METHOD FOR MAKING GLASS FIBER STRAND FOR RESIN REINFORCEMENT
Filed Jan. 8, 1968     4 Sheets-Sheet 1

INVENTORS
THOMAS E. PHILIPPS
& JAMES C. BELUE
BY
ATTORNEYS

May 11, 1971    T. E. PHILIPPS ET AL    3,578,426
METHOD FOR MAKING GLASS FIBER STRAND FOR RESIN REINFORCEMENT
Filed Jan. 8, 1968      4 Sheets-Sheet 4

INVENTOR.
THOMAS E. PHILIPPS
BY  JAMES C. BELUE 3,578,426
METHOD FOR MAKING GLASS FIBER STRAND FOR RESIN REINFORCEMENT
Thomas E. Philipps, Granville, and James C. Belue, Sylvania, Ohio, assignors to Owens-Corning Fiberglas Corporation
Continuation-in-part of application Ser. No. 493,505, Oct. 6, 1965. This application Jan. 8, 1968, Ser. No. 696,172
The portion of the term of the patent subsequent to Mar. 3, 1987, has been disclaimed
Int. Cl. C03c 25/02, 25/06
U.S. Cl. 65—3                                      11 Claims

ABSTRACT OF THE DISCLOSURE

Bundles of glass fibers and method of producing same wherein the fibers are etched and are held together along generally line contacts by a brittle binder formed by the deposition in situ of the material leached from the fibers.

CROSS REFERENCES TO RELATED APPLICATIONS

The present application is a continuation-in-part of our copending application Ser. No. 493,505 and filed on Oct. 6, 1965 and now Pat. No. 3,498,770.

BACKGROUND OF THE INVENTION

This invention relates to method of and apparatus for treating, conditioning and processing roving or bundles of mineral filaments or fibers and more especially to treating, conditioning and processing roving or linear bundles of continuous filaments of glass.

In conventional production and methods of forming and processing roving of glass filaments or fibers, it has been a practice to apply a size or bonding material on the filaments as they are formed and gathered into a roving formation to attain some degree of integrity or bonding of the filaments in roving formation. Such bonding materials are usually in the form of emulsions and upon evaporation of the water, the residue solids or bonding agents hold the materials in a group or roving formation.

Where the rovings are sized with starch, it is found that upon further processing and handling, particularly where the roving is severed into short lengths for use in reinforcing plastics or producing molded articles, the filaments of the severed lengths of roving may be substantially dispersed but do not provide good bond strength to later applied impregnating resins. Where the filaments are coated with a plastic, the filaments of the strand are cushioned and consequently the strand tends to bend instead of break when chopped. Consequently both types of prior art sized filaments are difficult to chop, and the chopping machinery must be kept sharp and in good repair. Even when two or more rovings bearing a dry starch or plastic bond or size are combined into a single roving, the handling and the mechanical operation of combining the rovings causes the bond to fracture and the filaments to separate, rendering the combined roving unsatisfactory for further processing because of the lack of integrity of the filaments in the roving. Such condition promotes interabrasion of the filaments and results in frequent filament breakage in combining rovings as well as a high fuzz level.

The present invention embraces a method of moisture-conditioning or treating the roving as the filaments of the roving are formed and wound in a package or treating or conditioning the roving prior to further processing with water or other vaporizable liquid whereby the roving while in wetted condition may be satisfactorily severed into short lengths or combined with other rovings to form a multiple assembly roving or subjected to other processing steps which may be satisfactorily carried out or performed by reason of the wetted condition of the filaments renders them more readily grouped.

An object of the invention resides in packaging or maintaining a package of roving of glass filaments in a wetted condition whereby the water or other vaporizable liquid effects a coherence of the filaments or fibers in the bundle or roving enabling the handling and processing of the roving to attain advantages and results not attainable in the processing of sized roving.

Another object of the invention resides in maintaining a package of roving or bundle of filaments of glass in a, wet condition and processing the roving while the package is in a wetted condition.

Another object of the invention relates to the processing of roving of glass filaments or fibers treated with water prior to severing the roving into short lengths and evaporating the moisture from the severed lengths of roving whereby the filaments of the short lengths of roving are maintained in grouped or integrated condition providing improved reinforcement for resinous materials in the production of reinforced molded end products.

Another object of the invention resides in processing a linear bundle or roving of unsized filaments of glass wetted with water, rendering the unsized roving or bundle suitable as reinforcement for high temperature plastics and resins by reason of the absence of sizing on the filaments which would be oxidized or otherwise adversely affected during processing at high temperatures.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention which follow.

SUMMARY OF THE INVENTION

It has been discovered, that glass fibers, particularly those substantially devoid of alkaline metal oxides, will undergo a generally self limiting controlled etching when held together in line contact and wetted with stagnant water having a pH less than approximately 7. In order for the etching to occur, the stagnant water must be devoid of film formers which restrict Brownian movement; and it has further been found that the fibers can be caused to be held together by a desirable type of brittle bond, if the stagnant water containing the etched materials is removed by a process which causes the liquid gas interface to recede toward the line contact during the removal of the water from the fibers. Glass fibers normally dry out quickly after forming, and steps must be taken to prevent the fibers from drying too rapidly and to prevent migration of the water containing the leached materials from the fibers from which the materials are leached.

Glass fibers unprotected from solid film formers are scratched when rubbed against themselves or against guiding surfaces. The only known commercial equipment for processing glass fibers into strands and woven forms requires the fibers to be pulled through a multiplicity of operations and over numerous guide surfaces.

The pulling action over the guide surfaces particularly where the fibers are not coated with film formers, generates high tensions which, in prior art processes, has caused strands of glass fibers to have broken filaments and insufficient strength to undergo the strand forming operations. A further discovery of the present invention is that glass fibers coated with water devoid of film formers can be coiled into a package if the fibers are first wetted and drawn into a strand of approximately 2,000 fibers, and this strand is then pulled over wetted guide surfaces at no more than approximately 5,000 feet per minute. Even so, the glass fibers which started out as monofilaments become broken into lengths which are believed to be longer than about 12 inches. The surface tension produced by the water in the tight bundle produced by the 2,000 filaments gives the strand sufficient integrity to withstand the pulling tension. A further discovery of the invention is that the strand that is devoid of film formers, and which is etched as above described, has improved resin bonding qualities, believed to be largely physical, with the surprising result that the strands of broken filaments of the present invention produces reinforced plastics having greater strengths then do the prior art strands produced with film formers.

Figure 1:
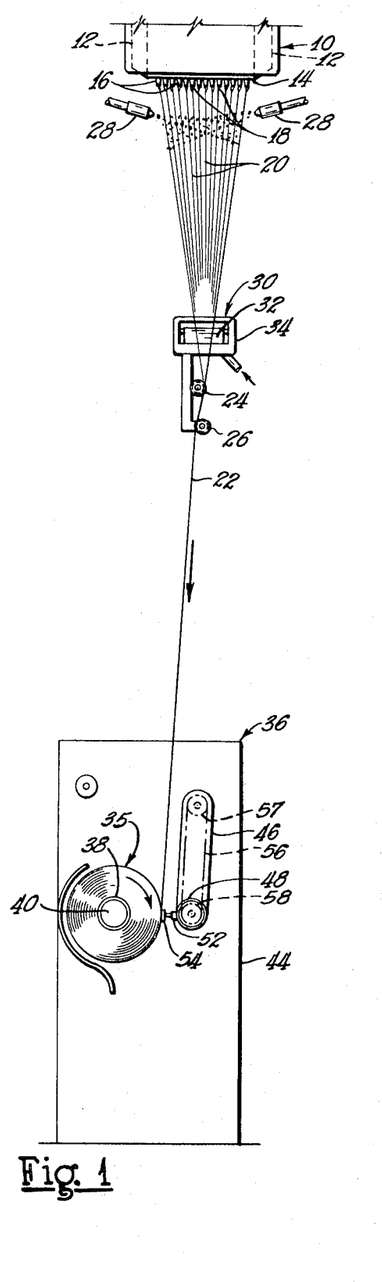
FIG. 1 is a semidiagrammatic front elevational view of an apparatus for carrying out the method of forming and packaging roving of continuous filaments of heat-softenable material under conditions providing a moisture saturated package.
Figure 2:
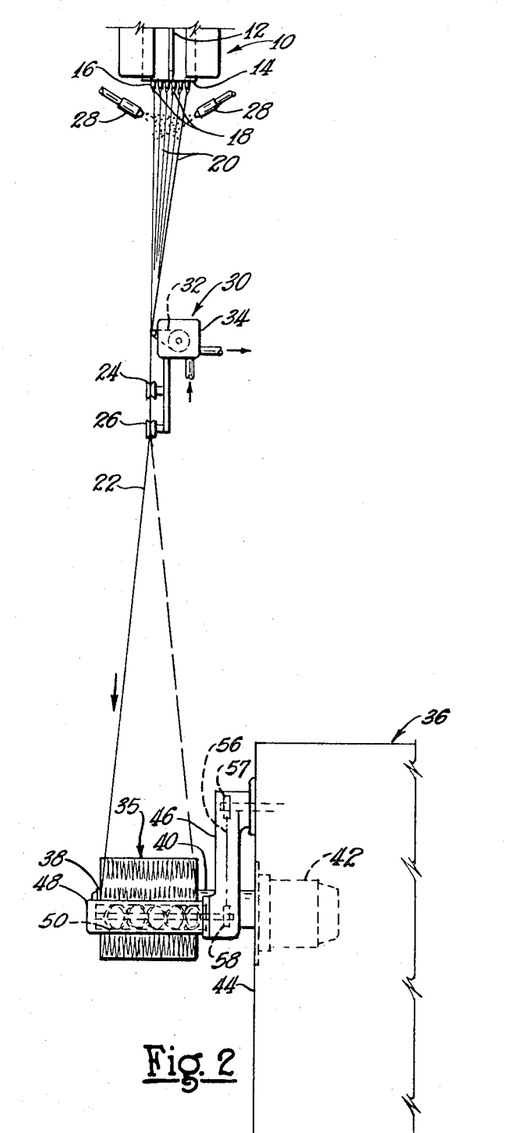
FIG. 2 is a side elevational view of the apparatus shown in FIG. 1.

FIGS. 1 and 2 of the drawings illustrate a method and apparatus wherein streams of glass or other heat-softened mineral material are attenuated to continuous filaments under conditions wherein the newly formed filaments are moisture conditioned or wetted with a vaporizable liquid such as water, the filaments gathered into a roving or linear bundle collected in a wound package under conditions wherein the filaments are maintained in a wetted condition during package formation whereby the completed package is substantially saturated with moisture to facilitate further processing operations.

The wetted roving or bundle of filaments of glass is of substantial mass in that the roving comprises filaments or strands of filaments upwards of two thousand or more filaments in a roving or bundle, the package of the roving being preferably wound in cylindrical shape with square ends and containing thirty pounds or more of roving. In FIGS. 1 and 2 there is illustrated a receptacle or stream feeder 10 containing a supply of heat-softened glass or other filament-forming material.

The feeder 10 may be supplied in a conventional manner with prerefined glass in the form of spheres or marbles which are reduced to molten condition either by heating the feeder or in a melter disposed above the feeder. The feeder may be connected with a forehearth (not shown) supplied with molten glass from a melting and refining furnace. The feeder 10 is provided at its ends with terminal lugs 12 for connection with a source of electric energy for electrically heating the glass in the receptacle to maintain the glass at a proper temperature and viscosity for attenuation to filaments.

The floor or tip section 14 of the feeder is provided with a large number of depending projections or orificed tips 16 for flowing streams 18 of glass from the feeder, the number of orificed tips being equal to the number of filaments attenuated and converged into a roving or linear bundle, each stream being attenuated into an individual continuous filament. Thus, if two thousand filaments are contained in the roving, the floor section 14 would have two thousand orificed projections.

The individual filaments are of an average diameter of about thirty seven hundred thousandths of an inch, although the filaments may be of greater or lesser size if desired. The large number of filaments making up the roving and the size of the filaments enables attenuation of the streams at a comparatively slow linear speed of about four thousand five hundred feet per minute with a slow traverse for distributing the roving lengthwise of a collector in forming a package.

As shown in FIGS. 1 and 2, the filaments 20 attenuated from the streams 18 are converged into a roving or linear bundle 22 by gathering shoes or guides 24 and 26 supported in any suitable manner. Nozzles 28 are disposed adjacent the feeder and are adapted to direct sprays of water onto the newly formed filaments. In carrying out the method of the invention, it is desirable that an ample amount of water be delivered onto the filaments so that the filaments are thoroughly wetted or moisture conditioned. An applicator 30, which may consist of a moving belt 32 acquiring a film of water by immersion in a receptacle 34 and wetting the filaments by contact, may be employed to assure thorough wetting of the filaments.

The roving 22 is collected into a wound package 35 by a winding apparatus 36, the roving being wound on a tubular sleeve or collector 38 telescoped onto a rotatable collet 40, the winding of the roving into a package attenuating the glass streams 18 to filaments 20.

The winding collet 40 is rotated by an electrically energizable motor 42 contained within the housing 44 of the winding apparatus. The speed of the collet driving motor 42 is progressively reduced by conventional means (not shown) as the package of roving increases in size so as to maintain substantially constant the linear speed of the filaments 20 in order to attenuate filaments of uniform size.

During a package winding operation, the roving is traversed lengthwise of the package being formed to distribute the strand throughout the length of the package. The traverse means illustrated is inclusive of a hollow arm or member 46 swingably supported by the housing 44, the arm being provided with a tubular horizontal section 48 in which is journally mounted a rotatable traverse actuating member 50. The member 50 is of cylindrical shape and has its peripheral surface fashioned with a multiple return groove or cam of conventional construction for reciprocation of a traverse member 52.

The axis of the traverse actuator 50 is parallel with the axis of the winding collet 40. The traverse member 52 cooperates with the multiple return groove in the member 50 for reciprocating the traverse. The traverse is provided with a guide member 54 normally disposed adjacent the periphery of the package for guiding the roving onto the package. The traverse actuator 50 is driven by means of a chain 56 cooperating with sprockets 57 and 58 driven by the motor 42 to maintain a proper speed ratio between the collet 40 and the traverse actuating member or cam 50.

Figures 3, 5, 6:
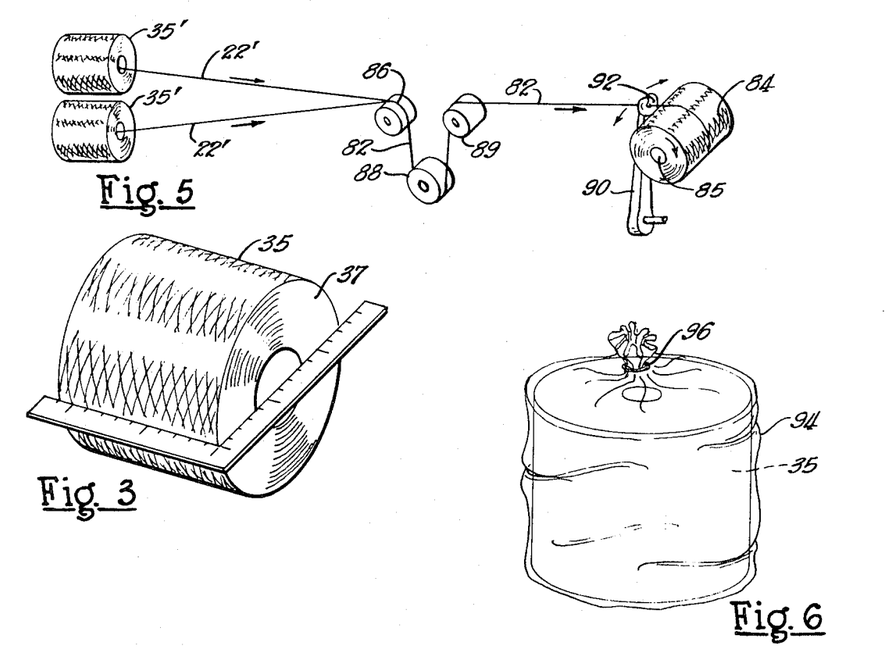
FIG. 3 is an isometric view of a cylindrically-shaped square end moisture conditioned package formed on the apparatus shown in FIGS. 1 and 2.
FIG. 5 is a semidiagrammatic view illustrating the method of processing wetted roving in forming composite or multiple assembly roving.
FIG. 6 illustrates a package of wetted roving enveloped in a moisture impervious closure.

The arm 46 supporting the traverse mechanism is arranged for pivotal movement about its journal support under conventional control means (not shown) to accommodate the enlarging package. This method of forming a package enables the production of a comparatively large package of roving of cylindrical shape having square ends 37 as shown in FIG. 3. As the roving is supplied with water from the spray nozzles 28 and, if desired additional water supplied to the filaments by the applicator 30, the filaments of the roving are thus enveloped in moisture or moisture conditioned at the time the roving of filaments is wound into the package.

The package is wound at a comparatively slow speed which is progressively reduced as the package increases in size. By reason of the comparatively slow speed winding of the roving into a package, a substantial amount of the water delivered onto the filaments is retained by the roving in the package so that the package is substantially saturated with moisture.

The moisture content of the finished package is usually from ten to twenty percent by weight of the package. Thus the completed package 35 of roving, when removed from the collet 40, is in a thoroughly wetted condition as the centrifugal forces of rotation of the collet during winding dispel only excess water leaving a substantial amount of water in the package.

It has been the usual practice to apply a size or bonding material to filaments of a roving and, upon drying of a package, the size bonds the filaments of the roving together. When the sized roving is subjected to further processing, such as cutting the roving into short lengths or combining sized rovings to form a composite roving, the cutting or other processing operations fractures the bond so that the filaments of the roving are not held together.

When a dry roving of sized filaments is fed to a severing or cutting device, it is found that only partial cutting takes place and that many of the filaments of the roving remain uncut. It is thought that the impingement of the cutter on the sized filaments fractures the bond causing the filaments to separate to an extent that all of the filaments are not severed.

Figure 4:
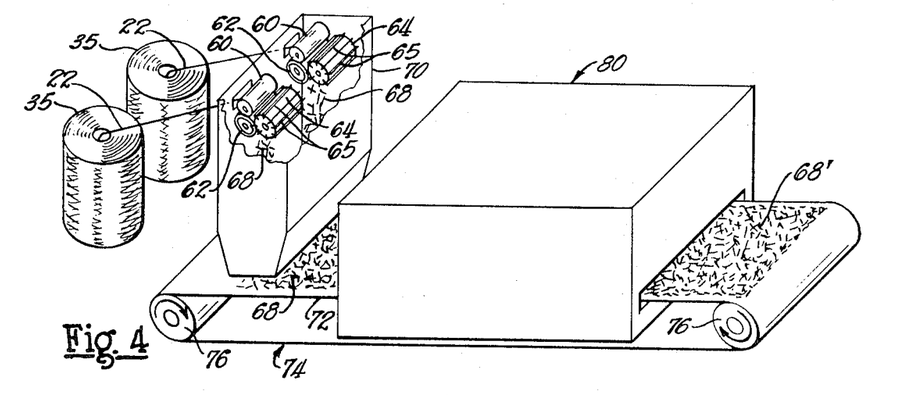
FIG. 4 is a semidiagrammatic isometric view illustrating a method of processing the wetted roving.

One of the features of the present invention resides in the method of cutting or processing the roving in a wetted condition. FIG. 4 illustrates the method of processing the wet roving by severing the roving into short lengths. The apparatus is inclusive of pairs of feed rolls 60, 62 adapted to withdraw the roving 22 from two packages 35 of roving in moisture saturated condition, as when removed from the winding machine collet 40.

Thus in carrying out the roving severing process the moisture saturated packages 35 of roving are conveyed from the winding machine to the position shown in FIG. 4 and the wet roving drawn from the packages by the feed rolls.

Associated with each pair of feed rolls is a rotatable cutting device 64 having severing knives 65 which engage and sever the rovings 22 into short lengths indicated at 68. The pairs of feed rolls and the cutting devices 64 are rotated at comparatively high speed.

The feed rolls 62 of each pair are preferably fashioned with a peripheral surface of rubber or other yieldable material which cooperates with the cutter 64 to sever the rovings. The severing devices may be of the character shown and described in Stotler Patent 2,719,336. It is found that the cutters or knives 65 engaging the wet roving effect a complete severing of all of the filaments of the roving.

Figures 9, 11:
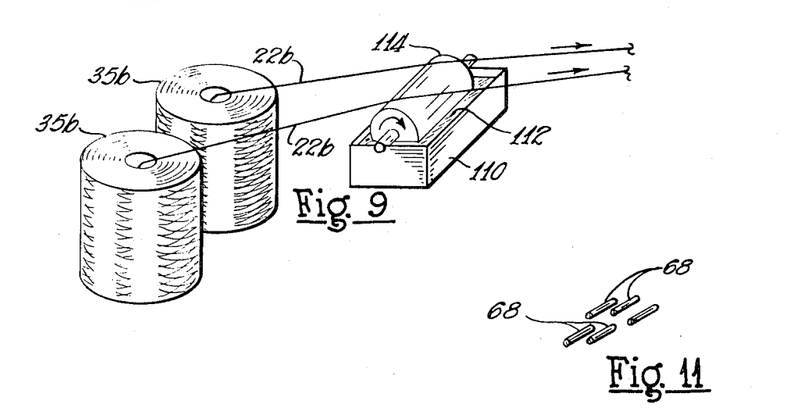
FIG. 9 illustrates a further modification of method for wetting roving preparatory to further processing.
FIG. 11 illustrates the group orientation of filaments in severed lengths of wetted roving.

It is believed that this advantageous result is attained by reason of the cohesion or surface tension of the water or moisture tending to hold the roving or linear bundle of unbonded filaments together during the severing operations. The severed lengths of roving 68 are shown in FIG. 11 to illustrate that the filaments remain in a group formation when the roving is processed in a wetted condition.

In further reference to FIG. 4, the cutting instrumentalities are contained in an enclosure 70, the severed lengths of rovings, moving downwardly by gravity through the enclosure 70, are collected on the upper flight 72 of an andless conveyer 74. The conveyer 74 is supported upon rolls 76 and one of the rolls being driven by motive means (not shown) to move the upper flight 72 of the conveyor in a right-hand direction.

Disposed adjacent the upper flight of the conveyer is a drying oven or drying device 80 for evaporating or volatilizing the moisture on the severed lengths of roving 68 while entrained on the conveyer flight 72.

The dryer 80 is preferably of a conventional dielectric type as it rapidly evaporates the water from the cut roving. However, radiant heat or other suitable type of dryer for evaporating or dispelling the moisture from the cut roving may be employed. The dried lengths of roving 68' delivered from the dryer 80 are particularly usable as reinforement in plastic articles and products.

The wetted or moisture saturated rovings may be processed or combined into a multiple assemblage roving product or composite roving. In combining rovings of sized filaments, the combining operation, necessarily involving flexure of the rovings, engenders fracturing of the size or bond, causing the filaments to separate, resulting in an inferior product and one which cannot be further processed because of the disintegration of the bond and its inability to hold the filaments in group or bundle formation.

FIG. 5 illustrates combining wet rovings into a composite or multiple assembly roving. Packages 35' of moisture conditioned or wetted rovings are disposed in a position whereby the wetted rovings 22' may be withdrawn from the packages and converged into a multiple roving assembly or composite roving 82, the composite roving being wound into a package 84 mounted on a rotating collet 85, the collet rotated by suitable motive means (not shown) in a conventional manner.

In combining the wet rovings 22', they are converged into one linear bundle or multiple roving 82 by a guide roll 86, and directed around idler or tensioning rolls 88 and 89.

An oscillating traverse member or arm 90, oscillated by conventional means, is equipped with a guide eye 92 accommodating the composite roving 82 for traversing the combined rovings lengthwise of the package 84 during package formation. In the method of combining of two or more rovings 22' in the manner illustrated in FIG. 5 utilizing unsized rovings in wetted condition, the water or moisture on the rovings tends to hold the filaments of each roving in a group without bonding, enabling the flexing of the rovings in the combining operation without separation of the filaments. In this manner a multiple roving assembly or composite roving is produced without in any way impairing the high strength characteristics of each roving in the assemblage.

Through the herein described method of winding a roving or linear bundle of filaments in wetted condition into a package, or combining wetted rovings into a composite or multiple assembly roving, the filaments comprising the rovings, under the cohering characteristics or surface tension of the water or moisture on the filaments, are maintained in group formation without bonding. This characteristic makes possible the further reprocessing of the packages of roving or composite roving.

Thus, the invention enables the handling and reprocessing of rovings or linear bundles of glass filaments without disruption of the groups of filaments and without impairing the strength characteristics of the roving.

In manufacturing processes utilizing the rovings, the severing operations or further processing operations may be carried on by processors at establishments remote from the filament attenuating the roving forming station shown in FIGS. 1 and 2. Furthermore, considerable time may elapse between the formation of the moisture-conditioned or moisture-saturated package and its further processing, thus necessitating storing the packages for the intervening period of time.

In order to maintain the packages in saturated condition without loss of moisture, the package may be enveloped in a moisture-impervious bag or envelope 94, shown in FIG. 6. The bag or envelope 94 may be fashioned of moisture impervious plastic film of conventional character and the bag closed by heat sealing or other means such as a securing ring or tie strip 96. By utilizing a bag or closure of plastic film such as polyethylene film of one mil or less in thickness, no appreciable weight or size is added to the package by this preparation for storage or shipping. Furthermore, the plastic envelope or container may be fashioned to closely embrace the contour of the package and minimize liability of damage to the package.

Figure 7:
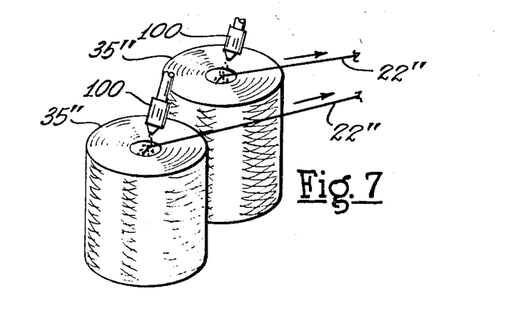
FIG. 7 illustrates a method of wetting roving as it is withdrawn from a package to moisture condition the roving for processing.

It has been found that packages of roving of unsized or unbonded glass filaments, which have lost substantial moisture by evaporation, may be successfully severed in the manner illustrated in FIG. 4, or processed in forming composite rovings as illustrated in FIG. 5, by wetting or moisture-conditioning the roving prior to severing or processing the roving. FIG. 7 illustrates one method of wetting a roving of unsized filaments preparatory to severing the roving into short lengths or otherwise processing the same. In the method shown in FIG. 7, the rovings 22″ are withdrawn from the central regions of the packages 35″.

Disposed above the hollow central region of each package is a nozzle 100 for delivering sprays of water or other nonresidue vaporizable liquids which have the characteristics of wetting the filaments. As the rovings 22″ are withdrawn from the package, the sprays of water or other wetting liquid wets the filaments of the roving to an extent that the cohering characteristics or surface tension of the water or liquid holds the filaments in a group. Rovings moisture-conditioned or wetted in this manner may be successfully severed into short lengths or combined into composite roving in the manner hereinbefore described.

Figure 8:
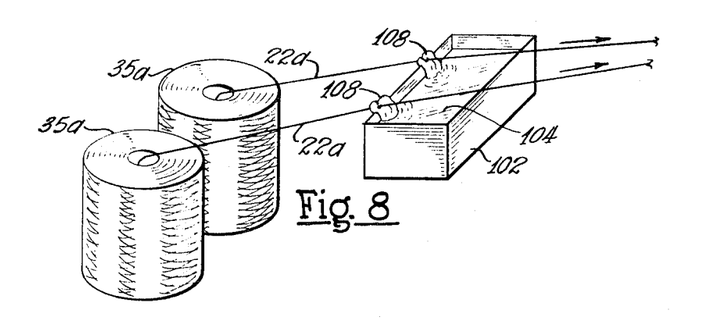
FIG. 8 illustrates a modified method of moisture conditioning roving preparatory to processing.

FIG. 8 illustrates another method of moisture conditioning or wetting rovings of unsized filaments withdrawn from packages for processing. The rovings 22a are drawn from the inside or central regions of the packages 35a of roving.

A receptacle or container 102 is provided containing water 104 or other nonresidue vaporizable liquid. Immersed in the water and having portions disposed for engagement with the rovings 22a are water saturated bodies or applicators 108, the roving passing in contact with the saturated bodies 108 to wet the filaments of the rovings.

The bodies 108 may be of any suitable material in which the water or liquid will be dispersed by capillary action such as sponge, wettable fabric or clumps of wettable fibers or other material for transferring water onto the rovings.

FIG. 9 illustrates another means or method of wetting rovings of unsized filaments to moisture condition the rovings for processing operations. Rovings 22b are drawn from the central or inside region of the packages 35b of roving. A container 110 is adapted to contain water 112 or other nonresidue vaporizable liquid. Journally supported by the container 110 is a rotatable roll applicator 114 partially immersed in the water 112 whereby the periphery of the roll continuosuly acquires a film of water. The rovings 22b are drawn tangent to the periphery of the applicator roll 114 and in contact therewith whereby the rovings acquire a film or coating of water. The container 110 is connected with a water supply by conventional means (not shown).

Figure 10:
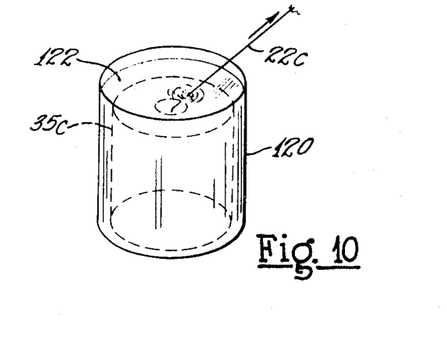
FIG. 10 illustrates a method of wetting roving by package immersion.

FIG. 10 illustrates a method of wetting or moisture conditioning roving of unsized glass filaments preparatory to cutting operations or other processing operations of the roving. A container 120 is filled with water 122 to a height to cover a package 35c of roving.

When it is desired to process a package of dried roving of unsized filaments or a package having a low moisture content, the package is immersed in the water in the container 120 and the roving 22c withdrawn from the package. In this manner the roving is thoroughly wetted in preparation for further processing.

The method and apparatus hereinbefore described enables the processing of rovings or linear bundles of unsized filaments of glass treated with water or moisture-conditioned whereby the roving may be handled in a wetted state. The moisture-saturated package may be processed immediately after its removal from the winding apparatus shown in FIGS. 1 and 2 without further water treatment. If moisture-saturated packages of roving are to be stored or shipped, the packages may be enveloped in moisture impervious closures in the manner shown in FIG. 6, preventing any loss of moisture from the packages.

Figure 12:
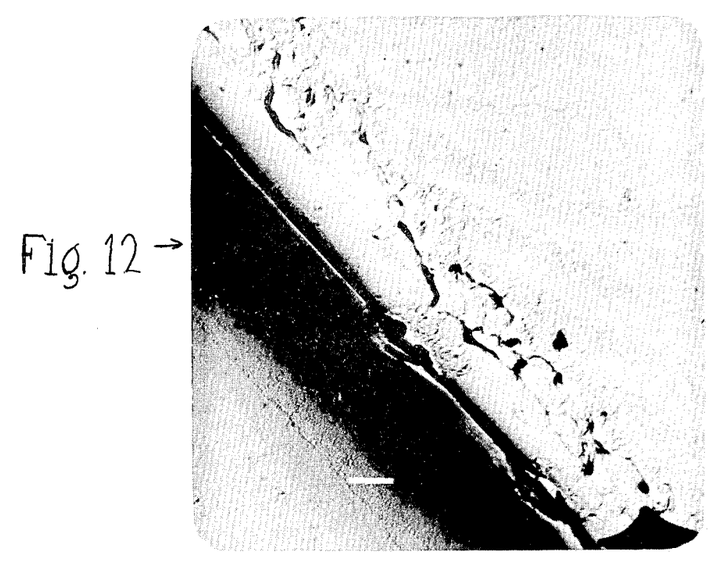
FIG. 12 is an electron photomicrograph of a typical sample of fibers removed from a package of the type shown in FIG. 12, and in which the white bar is equal to one micron in length.

FIG. 12 is a photograph of a package produced by the equipment shown in FIGS. 1 and 2 according to the procedure above described. The photograph shows ridges running across the width of the package and which are produced by the generally radially alignment of crossover points. The strands cross over each other at an occluded angle of approximately 15°, and because the traverse mechanism is driven by gearing from the same motor which rotates the package, the crossover points repeat to account for the ridges. As shown in the photograph, the ridges are approximately ¼ inch apart and the strands have a slight valley between these crossover points. The strands, in the area of the valleys between the ridges, have a greater spacing between themselves than they do in the regions of crossover to provide channels around the strands running radially through the package. Because the size which is applied to the fibers is devoid of film formers, water that is confined in these channels is displaced much more easily than is the water that is held between the fibers of a strand; so that upon drying of the package, the water interface moves through the package to the surface of each strand. This is significant as will later be explained.

As explained above, the water which is applied to the fibers must be devoid of solid film formers, as for example starch, plastics, waxes, etc. The material applied to the fibers can be water alone or can have small amounts of nonresinous, nonfilm forming materials in amounts usually less than 1 percent. These materials can be the calcium and magnesium impurities usually found in tap water, or can be purposeful additions of organosilane coupling agents or liquid lubricants neither of which form solid films around the fibers which interfere with the etching of the glass. Small amounts of organosilane coupling agents generally less than 2 percent do not interfere with the leaching of the glass and are helpful for achieving coupling of later applied resins to the glass. Soluble lubricants and particularly cationic lubricants are helpful in that they help prevent scratching while also not detracting from the etching process. Cationic lubricants will generally be present in less than 1 percent of the liquid.

By way of example, the process above described was carried out using water having the following composition:

| | Percent |
|---|---|
| Glacial acetic acid | 0.20 |
| Gamma aminopropyl triethoxy silane | 0.04 |
| Cationic lubricant | 0.10 |
| Water (deionized) | 99.30 |

Figure 13:
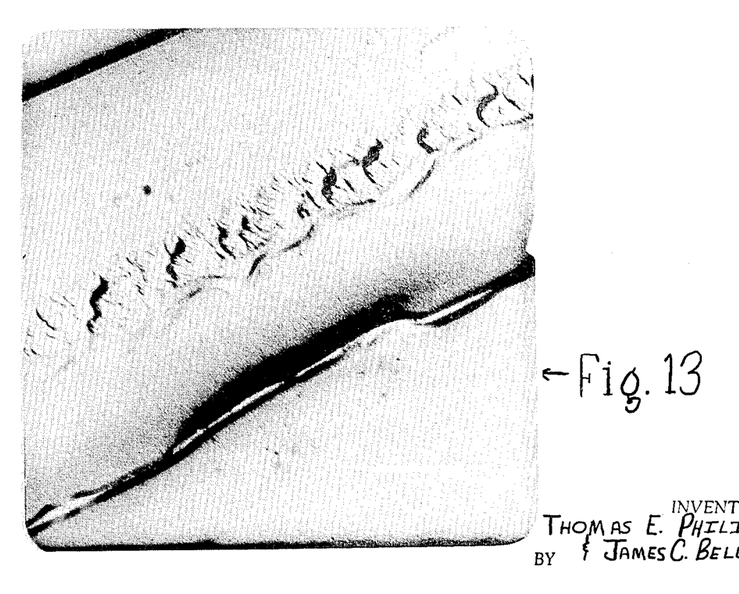
FIG. 13 is a photomicrograph of a fiber removed from a package which was prevented from drying for approximately 24 hours.

This material was formed into a package as above described. The package after approximately 1 hour at room temperature was placed in an oven and dried at 265° F. for 24 hours. A strand was taken from the center of the package. This strand was subdivided into fibers and an electron photomicrograph made thereof. This electron photomicrograph is shown in FIG. 13, and it will be seen that there is a general leaching of the surface of the fibers with angular bands of increased leaching leading to a longitudinal line, of which there are at least three on every fiber. The longitudinal line running from the top left to the bottom right of the photograph shows pronounced etching accompanied by a deposition of material that is generally amorphous in nature, and which is the leached material deposited along the line contact of the fibers with an adjacent fiber. When the fibers were pulled apart, the fracture relief shown was produced and some removal of material from the fiber occurred. It is evident from the photograph that there was a concentration of the etched material along the line contact with the adjacent fiber during the drying operation, which as the concentration increased, caused a pronounced etching followed by a later deposition of the etched material to produce a brittle type of bond between the fibers. This explains why the fibers are held together in their dry condition and why the fibers when mixed with resin substantially completely break apart into individual filaments. The reason why an open type of coiled package having channels as above described is important, is now apparent. The water which occupies these channels first moves out of the package to allow an air-water interface to develop adjacent the surface of each strand. The water which is within these channels contains very little leached material because of the stagnant conditions under which the water is kept, so that this water can be removed from the package without also removing any appreciable amount of the material leached from the fibers.

The leaching of the fibers is in general an exponential function of the temperature so that the desired amount of leaching can occur during the drying operation. In the package having channels above referred to, water is kept within the strand during the time that the water interface is proceeding through the channels to remove the water from the channels. During this time, a relative humidity of approximately 100 percent exists in the channels and the water within the strand is kept in place. The leaching operation, therefore, occurs all during the period that the water is being removed from the channels. Since the water within the channels is a major portion of the total water of the package, a considerable amount of leaching of the fibers takes place during most of the period of time that the package is in the drying oven. It can be assumed that during most of this time, the water in the strand is close to 212° F. and that the leaching is considerably greater than occurs when the package is stored at room temperature. After the water has been dried out of the channels, and with the water-air interface now adjacent the surface of each strand, the interface moves toward the fibers of each strand rather than towards the surface of the package. This causes the leached material to remain in situ and be concentrated at the juncture of the fibers, which is less than a fiber diameter away from the area from which the materials were leached. In a tightly wound package, the water would migrate as a body to the surface of the package and be evaporated from this position.

On the other hand, packages or chopped strand which have been stored wet in a vapor proof bag for a week or more, and then dried at room temperature have also been leached and bonded together. Deterioration of the fibers does not appear to occur even though the fibers are stored at room temperature for over two months, and therefore, the leaching of the fibers appears self limiting.

The liquid composition given above had a pH of 5, because acetic acid had been added. As previously stated, however, pure water can be used and will give approximately the same degree of etching as shown in FIG. 13.

Textile glass fibers are produced from glass compositions such as those disclosed in Schoenlaub U.S. 2,334,961 and represented by the following composition:

| | |
|---|---|
| $SiO_2$ | 53.0 |
| $Al_2O_3$ | .8 |
| CaO | 16.8 |
| MgO | 4.4 |
| $B_2O_3$ | 9.5 |
| $Na_2O$ and $K_2O$ | 0.4 |
| $TiO_2$ | 0.4 |
| $F_2$ | 1.1 |

Fibers produced above had the above composition. As explained above, the fibers had a diameter of .00037 inch, the strand comprised 2,040 filaments, and was formed at 4,500 feet per minute.

Fibers of E glass were formed in the laboratory and were bound in side by side relationship in a thick band on a winding tube. Double deionized distilled water (substantially absolute purity) was applied to the fibers before being wound on the winding tube, and the tube remained wet for 2 hours following which it was dried at 265° F. for 24 hours. An electron photomicrograph was made of a typical sample of these fibers and is shown in FIG. 14. The figure shows that a controlled etching of the surface of the fiber was had and that this etched material concentrated along the line contact which the fiber shown had with another fiber. The photomicrograph also shows the same general type of fracture surface that is shown in FIG. 13 when the bonded fibers are broken apart. The pure water used, of course, had a pH of 7. Any pH less than approximately 7 can be used. A pH greater than 7 is to be avoided, since a pH of 9 and above produces destructive breakdown of the silicon network of the fibers. The white bar shown in FIG. 14 has a length of 1 micron. Other photomicrographs which have been made show that hardness of the water is also deposited out as an additional surface roughing material upon the surface of the fibers. It is of secondary importance and appears to add to and not detract from the leaching and bonding effect of the invention. The materials which are leached from the fibers are the calcia, alumina, magnesia and other metal oxides forming the glass. The materials from anamorphous material when dried upon the fibers and reacts to a small degree with the silica of the fiber as the solution of these materials becomes concentrated during the drying operation. Alkaline metal oxides are, or course, much more soluble, so that glasses containing $Na_2O$ and $K_2O$ will produce the same type of structure as above described, and will leach at rates proportional to their concentration in the glass. Glass containing $Na_2O$ and $K_2O$ are not to be preferred, since their leaching effects are not as controllable and self limiting as are those of the glasses that are substantially devoid of the alkaline metal oxides.

The leaching process is generally self limiting, since the length of time which the wet packages can be stored is not critical. The leaching process is generally a diffusion process, since the water is stagnant. Solid film formers which thicken the water inhibit the etching process, however, and cannot be present. Film formers reduce the Brownian movement of the materials being etched to greatly inhibit the etching of the glass and the redeposition of the etched material.

Example 1

A tubular pipe structure was prepared by the following filament winding process. Strand from a coiled package that was produced as previously described was wound upon a cylindrical mandrel, the lower portion of which was immersed in an epoxy resin bath. This bath was made by mixing 14 parts of meta-phenylenediamine curing agent with 100 parts of an epoxy material having the following approximate formula:

where $n$ equals approximately 3.6.

The material was heated to 140° F. for just sufficient time to melt the curing agent. After a sufficient amount of the strand was filament wound onto the mandrel and coated with the epoxy and curing agent, the mandrel was removed and the pipe cured in an oven at 350° F. for one hour.

Pipe produced according to the procedure given above was capped off at both ends and surrounded with an electrically conductive screen. An electrolyte was introduced into the closed pipe through a suitable connection in one end cap, and the electrolyte was alternately pressurized to approximately 800 p.s.i. and then depressurized. Pipe produced as above described having an internal diameter of 2 inches and a wall thickness of ¼ inch has withstood as many as 100,000 of the above described cycles before leakage was sensed by the electrically conductive screen.

By way of comparison, and not according to the invention, pipe produced as above described excepting that the strand used was coated with the material of Example 6 of the Collier Pat. 2,801,189, withstood only approximately 10,000 cycles before weep.

Example 2

A molding resin was produced by mixing the following materials in the parts by weight indicated:

| | |
|---|---|
| Diallyl phthalate polymer | 6,860 |
| Diallyl phthalate monomer | 140 |
| Acetone | 7,000 |
| Tertiary butyl perbenzoate | 210 |
| Zinc stearate (mold release) | 170 |

The diallyl phthalate polymer used had the following approximate formula:

n=approx. 10

One thousand parts of strand chopped into approximately ¼ inch lengths was added to a Z-blade bread mixer. The mixer was started and allowed to run for one minute, and thereafter 2,000 parts of the molding resin composition given above was added to the chopped strand and the mixer was allowed to run thereafter for one minute. This mixture was poured from the mixer and spread out on a sheet of cellophane to air dry for 24 hours to remove the acetone solvent. Thereafter, it was oven dried for one hour at 60° C., after which the oven temperature was raised to 80° C. and held at this temperature for another hour following which it was raised to 90° C. and held at this temperature for 20 minutes. A 10 inch by 10 inch by ¼ inch thick sheet of this material was placed in a curing press under 50 tons pressure at 300° F. for 15 minutes. This material had a flexture strength of 30,000 p.s.i.

By way of comparison and not according to the invention, a molding composition made as above described excepting that chopped fibers produced from the same strand used in the control recited in Example 1 had a flexural strength of only approximately 10,000 p.s.i.

The water used in coating the fibers in the above examples and which produced the bond had 0.20 percent of glacial acetic acid, 0.40 percent of gamma aminopropyltriethoxy silane, 0.10 percent of a cationic softener which was a reaction product of tetraethylene pentamine and stearic acid in a molar ratio of 1 to 1.8, and 99.30 percent by weight of softened water. This softened water contained 0.05 p.p.m. of silica sol and was softened by a Cochran Co. softening unit containing a bottom layer of AM resin and a top layer of CRW resin which were regenerated by a 22 percent sulfuric acid solution followed by a 10.6 percent sodium hydroxide solution.

Example 3

A strand of 2,040 glass filaments was prepared as above described using tap water to which was added 0.20 percent of glacial acetic acid and 0.40 percent of gamma aminopropyltriethoxy silane. The strand was chopped into approximately ¼ inch lengths as above described. Thirty parts of the ¼ inch chopped strand was dry blended with 70 parts of a polyphenylene oxidepolystyrene mixture. The resin mixture contained 50 percent of a polyphenylene oxide powder of a molecular weight of 25,000, and 50 percent by weight of a polystyrene powder likewise having a molecular weight of approximately 25,000. The mixture of powders has a particle size of less than 200 mesh U.S. sieve series. The mixture of chopped strand and resin was fed to an extruder heated to a temperature of 550° F. to form ⅛ inch diameter pellets approximately ⅜ inch long. The pellets were than fed into an injection molding machine, also heated to 550° F. and extruded into ASTM type 1 dog bone test samples which are 8½ inch long, and have a center section 2½ inch long, ½ inch wide and ¼ inch thick. Several dog bone samples prepared in this manner were tested at 73° F. and had an average breaking strength of 23,000 pounds per square inch.

By way of comparison, and not according to the invention, ASTM type 1 dog bone testing specimens prepared in the same manner as above described excepting that the chopped strand was prepared from fibers coated with a polyester resin according to prior art techniques had an average breaking strength of 18,000 pounds per square inch. The polyester coated fibers had a 2 percent loss on ignition, and the size which was applied to the fibers had the following composition:

| Material: | Percent by weight |
|---|---|
| Propylene glycol, succinic anhydride, phthalic anhydride polyester polymer [1] | 2.5 |
| Gamma aminopropyltriethoxy silane | 0.25 |
| Acetic acid | 2.44 |
| Cationic softener of Example 1 | 0.087 |
| Iso octyl phenyl polyethoxy ethanol | 0.04 |
| Polyvinyl alcohol | 0.087 |
| Polyvinyl pyrrolidone | 2.1 |
| Deionized water | Balance |

[1] The polyester resin was made by reacting 12.5 parts of polypropylene glycol, 7.5 parts succinic anhydride, and 11 parts of phthalic anhydride to an acid number of approximately 30.

Example 4

Thirty parts of the same type of chopped strand as used in Example 3 was added to 70 parts of caprolactam monomer containing a tenth of a percent of potassium hydroxide. The material was thoroughly mixed and brought to a boil following which it was immediately poured upon a flat surface to harden into a prepolymer sheet. The prepolymer sheet was then ground up in a hammermill to approximately ⅛ inch size flakes and these flakes were put into an injection molding machine heated to 500° F. and extruded into Izod impact test specimens. When tested, these Izod test specimens had an impact strength of 1.6 foot pounds.

By way of comparison, and not according to the invention, test specimens were made from the same nylon material, but using 30 parts of chopped strand having a 2 percent coating thereon of the same polyester size given in Example 3. Izon test specimens prepared from the prior art polyester coated strand had an impact strength of 0.8 foot pounds.

It will now be apparent that the objects heretofore enumerated have been achieved, and that there has been provided a new and improved glass and method of producing the same wherein the glass fibers are leached by water which does not migrate away from the surface of the fibers and which deposits the etched material along lines of fiber contact to produce brittle bonds giving strand integrity of a type which permits complete filamentizing when the strand is broken apart.

It is apparent that, within the scope of the invention, modifications and different arrangements may be made other than as herein disclosed, and the present disclosure is illustrative merely, the invention comprehending all variations thereof.

We claim:

1. The process of producing leachable glass fibers whose surface has a controlled etch and which fibers are held together by the products leached from the fibers, said process comprising: flowing streams of molten glass, ments into a roving while causing the voids between filaments of the roving to be generally filled with water that is devoid of film formers which thicken the water and that prevent leaching of the fibers, coiling the roving into a wound package in which the filaments of the roving are in generally parallel engagement and in a manner producing voids between adjacent coils of the roving to hold water between the coils of the roving, preventing the package from drying out for a sufficient period of time to allow the water in the roving to leach the filaments and approach saturation with respect to materials leached from the filaments, and removing the water containing the leached material from the roving with the filaments in undisturbed contact and with the liquid interface moving toward the points of contact of the filaments to concentrate the water at points of contact of the filaments.

2. The process of claim 1 wherein the package is stored in a water impervious bag and during which time the fibers become leached.

3. The process of claim 1 wherein the roving is caused to traverse the package during the coiling operation in a fixed relationship relative to the rotational movement of the package to cause the crossover points of the roving to be generally radially aligned.

4. The process of claim 3 wherein the step of removing the water is accomplished by a drying operation of the package.

5. The process of claim 1 wherein the glass is substantially devoid of alkaline metal oxides.

6. The process of claim 1 wherein the glass fibers are made of E glass.

7. The process of claim 1 wherein the water contains a small amount but less than approximately 1 percent of a silane coupling agent.

8. The process of claim 1 wherein the water that is applied to the filaments to fill the voids therebetween comprises approximately 0.20 percent of glacial acetic acid, approximately 0.40 percent of gamma aminopropyltrialkoxy silane, and approximately 0.10 percent of a cationic lubricant.

9. The process of producing glass fibers comprising: flowing streams of molten glass, attenuating the molten streams into filaments, gathering the filaments into a roving, causing the filaments in the roving to be coated with water that is generally devoid of film formers that prevent leaching of the fibers, causing the water to remain in situ on the filaments to produce a controlled leaching of material out of the filaments into the water, and drying the roving while the filaments are in undisturbed contact to deposit the leached material on the filaments and to bond the filaments together.

10. The process of producing glass fibers comprising: flowing streams of molten glass, attenuating the molten streams into filaments, gathering the filaments into a strand and coiling the strand into a package, causing the filaments of the strand of the package to be coated with water that is generally devoid of film formers that prevent leaching of the fibers, causing the filaments to be leached by the water under conditions wherein the materials leached from the filaments are retained by the water adjacent the surface from which they were leached, and drying the strand while the filaments are in undisturbed contact in a package to deposit the leached materials in the areas of contact adjacent the surfaces from which the materials were leached.

11. The process of claim 10 wherein the strand is coiled into a package wherein the cross over points of the coils are aligned to space the strands and produce channels through the package, and whereby an interface is formed through the channels upon drying which interface recedes from the channels laterally into the adjoining strand to cause the leached materials to be retained adjacent the filament surfaces from which they were removed.

References Cited
UNITED STATES PATENTS

| | | | |
|---|---|---|---|
| 2,184,320 | 12/1939 | Simpson | 156—24X |
| 2,624,658 | 1/1953 | Parker et al. | 65—31 |
| 3,012,930 | 12/1961 | Labino | 156—24X |
| 3,356,563 | 12/1967 | Marzocchi | 65—31X |

S. LEON BASHOVE, Primary Examiner

R. L. LINDSAY, Jr., Assistant Examiner

U.S. Cl. X.R.

65—31; 156—24